W. F. Class,
Water Sprinkler,
No. 54,685.  Patented May 15, 1866.
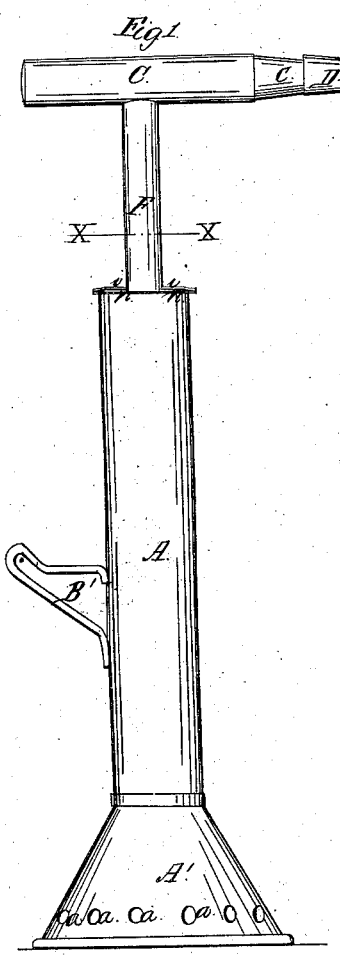
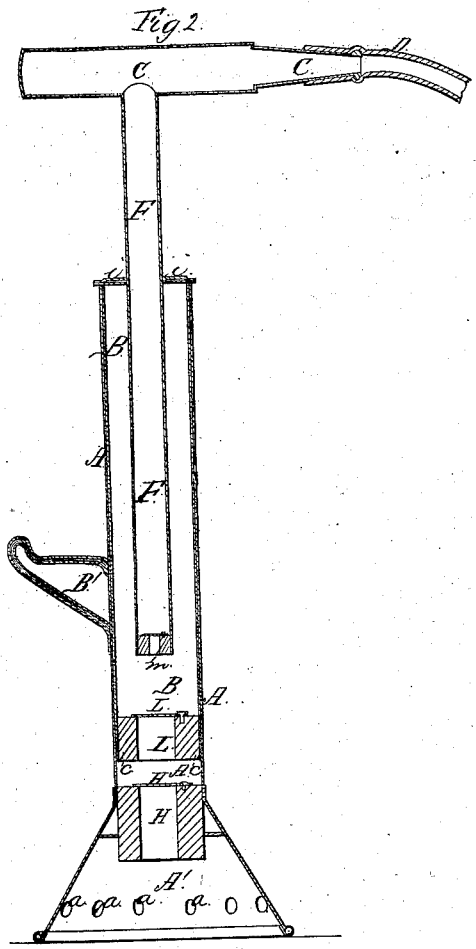
Witnesses:
W. H. Burridge
All. McClelland
Inventor
William Class

UNITED STATES PATENT OFFICE.

W. F. CLASS, OF CLEVELAND, OHIO, ASSIGNOR TO NATHAN PAGE, OF SAME PLACE.

PUMP-SPRINKLER.

Specification forming part of Letters Patent No. 54,685, dated May 15, 1866.

*To all whom it may concern:*

Be it known that I, W. F. CLASS, of Cleveland, in the county of Cuyahoga and State of Ohio, have invented certain new and useful Improvements in Garden-Sprinklers; and I do hereby declare that the following is a full and complete description of the construction and operation of the same, reference being had to the accompanying drawings, making a part of this specification, in which—

Figure 1 is a side elevation. Fig. 2 is a vertical section. Fig. 3 is a transverse section in in the direction of the line $x \, x$ in Fig. 1.

Like letters of reference refer to like parts in the several views.

My improvement relates to sprinklers, as hereinafter described.

In Figs. 1 and 2, A is a cylinder, the base A' of which is flaring, as represented, with holes $a'$ round in the lower part of it. B is a plunger that fits close inside of the cylinder, as seen in Fig. 2, and F is a pipe in the middle of the plunger, that enters a nozzle, C, at the upper end. In the lower part of the cylinder there is a valve, H, and in the lower end of the plunger there is a similar valve, L, with packing $c$ around it, so as to form a water-tight joint. In the lower end of the pipe F there is likewise a valve, $m$.

The upper end of the plunger B is closed, excepting where the pipe F passes through, round which there may be packing to form a close joint. On the top of the plunger there are lips $i$ on opposite sides, of the shape represented in the drawings, a top view of which is seen in Fig. 3.

Projecting from the pipe F are wings $n$, that are turned under the lips, as shown in Figs. 1 and 2 and indicated by the dotted lines in Fig. 3, for attaching the pipe or rod F to the plunger. These wings are turned round between the lips, as represented in Fig. 3, when it is desired to detach the rod from the plunger.

On the end of the nozzle C is placed an elastic tube, D, that can be of any desired length. B' is a handle or foot-rest on one side of the cylinder to keep the sprinkler down in place when in operation.

The manner of using and operating this sprinkler, constructed as described, is as follows: The base A' is inserted in the water or in a tub or vessel of water, when the water will run into the base and cylinder through the holes $a$. As the plunger B is drawn up by taking hold of the nozzle C, which answers for a handle, a vacuum is formed in the cylinder, when the water will rise through the valve H, and pass up into the cylinder, and as the plunger descends or is moved down the pressure of water in the cylinder will close the lower valve, H, and open the valve L, when the water, rising in the plunger, opens the valve $m$ and passes up into the pipe or rod F, and as the plunger is thus worked up and down the water will be forced through the nozzle into the pipe D, and discharged onto the plants or flowers, or wherever it is desired to convey the water.

To decrease the force and quantity of water thus discharged, the pipe F is disengaged from the plunger B, as before stated, and worked up and down, acting as a pump rod or plunger for raising the water and discharging it in less quantities and not so much force as when the other plunger is used. By this means a less quantity of water and with less force is discharged upon such plants and flowers as are too delicate to receive the full force and volume of the water from the action of the plunger.

What I claim as my improvement, and desire to secure by Letters Patent, is—

1. The pipe F, nozzle C, and plunger B, in combination with the cylinder A, valves H L, and perforated base A', when arranged in the manner and for the purpose set forth.

2. The lips $i$, wings $n$, and plunger B, in combination with the valves H L $m$, pipe F, and nozzle C, when arranged in the manner and for the purpose described.

WILLIAM F. CLASS.

Witnesses:
W. H. BURRIDGE,
A. W. McCLELLAND.